US011328254B2

(12) United States Patent
Tondepu et al.

(10) Patent No.: US 11,328,254 B2
(45) Date of Patent: *May 10, 2022

(54) AUTOMATIC GROUP CREATION BASED ON ORGANIZATION HIERARCHY

(71) Applicant: Microsoft Technology Licensing, LLC, Redmond, WA (US)

(72) Inventors: Madhuri Tondepu, Bellevue, WA (US); Maithili Vijay Dandige, Kirkland, WA (US); Shanshan Qu, Redmond, WA (US); Yongjun Xie, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,174

(22) Filed: Jan. 12, 2021

(65) Prior Publication Data
US 2021/0133682 A1 May 6, 2021

Related U.S. Application Data

(63) Continuation of application No. 15/602,869, filed on May 23, 2017, now Pat. No. 10,922,653.

(60) Provisional application No. 62/478,494, filed on Mar. 29, 2017.

(51) Int. Cl.
*G06Q 10/10* (2012.01)
*H04L 9/40* (2022.01)

(52) U.S. Cl.
CPC ..... *G06Q 10/101* (2013.01); *H04L 29/06823* (2013.01)

(58) Field of Classification Search
CPC .................. G06Q 10/101; H04L 29/06823
See application file for complete search history.

(56) References Cited

U.S. PATENT DOCUMENTS

| | | | | |
|---|---|---|---|---|
| 2006/0168230 A1* | 7/2006 | Caccavale | ............. | H04L 41/145 709/226 |
| 2008/0186926 A1* | 8/2008 | Baio | ................... | H04L 12/1818 370/338 |
| 2011/0252112 A1* | 10/2011 | Glanton | ................ | H04L 67/306 709/217 |
| 2012/0042013 A1* | 2/2012 | Roman | .................. | G06Q 10/10 709/204 |

(Continued)

*Primary Examiner* — Tonia L Dollinger
*Assistant Examiner* — Joseph M Cousins
(74) *Attorney, Agent, or Firm* — Michael Best & Friedrich LLP

(57) ABSTRACT

Variety of approaches to provide an automatic group creation based on an organization hierarchy are described. A hosted service initiates operation(s) to automatically create a group upon detecting a new organization hierarchy or a utilization of a feature of a hosted service by an existing organization hierarchy. Next, group members are determined based on the organization hierarchy. The group is created that includes the group members to coordinate services within the hosted service based on the organization hierarchy. Furthermore, an attribute of the created group is defined. A resource is also generated for the created group. The resource includes a notebook, a work space, a collaboration site, and/or a planner. The created group is deployed to coordinate the services. The resource is managed through the services.

20 Claims, 9 Drawing Sheets

(56) References Cited

U.S. PATENT DOCUMENTS

| | | | |
|---|---|---|---|
| 2013/0160104 A1* | 6/2013 | Carlson | G06F 21/31 |
| | | | 726/7 |
| 2014/0334624 A1* | 11/2014 | Bernsen | H04L 9/0866 |
| | | | 380/279 |
| 2015/0110090 A1* | 4/2015 | Ding | H04L 67/1051 |
| | | | 370/338 |
| 2018/0130138 A1* | 5/2018 | Kumar | H04L 51/32 |

* cited by examiner

AUTOMATIC GROUP CREATION BASED ON ORGANIZATION HIERARCHY

CROSS-REFERENCE TO RELATED APPLICATIONS

This application is a continuation of U.S. patent application Ser. No. 15/602,869 filed May 23, 2017, which claims the benefit under 35 U.S.C. § 119(e) of U.S. Provisional Patent Application Ser. No. 62/478,494 filed on Mar. 29, 2017. The disclosure of both the prior filed U.S. Non-Provisional Patent application and the U.S. Provisional Patent application is hereby incorporated by reference in its entirety.

BACKGROUND

Enhanced information exchange technologies have changed processes associated work and personal environments. Automation and improvements in processes have expanded scope of capabilities offered for personal and business data consumption. With the development of faster and smaller electronics, execution of mass processes at cloud based systems have become feasible. Indeed, applications provided by data centers, data warehouses, data workstations have become common features in modern personal and work environments.

Online services and applications increasingly provide useful tools for a variety of customers ranging from large enterprise entities to small businesses and individuals. A variety of productivity, data storage, collaboration, and other applications are provided under the umbrella of one or more hosted services. Thus, a hosted service can add features and take advantage of the coordinated management of various applications. Manual management of such features and coordination by individual users can be cumbersome and inefficient.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic group creation in a hosted service environment based on an organization hierarchy. A hosted service, according to embodiments, may initiate operations to automatically create a group upon detecting a new organization hierarchy or a utilization of a feature of a hosted service by an existing organization hierarchy. Next, group members may be determined based on the organization hierarchy. A group may be created comprising the group members to coordinate services within the hosted service based on the organization hierarchy. Furthermore, an attribute of the created group may be defined. A resource may also be generated for the created group. The resource may include a notebook, a work space, a collaboration site, and/or a planner. The created group may be deployed to coordinate the services. The resource may also be managed through the services.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
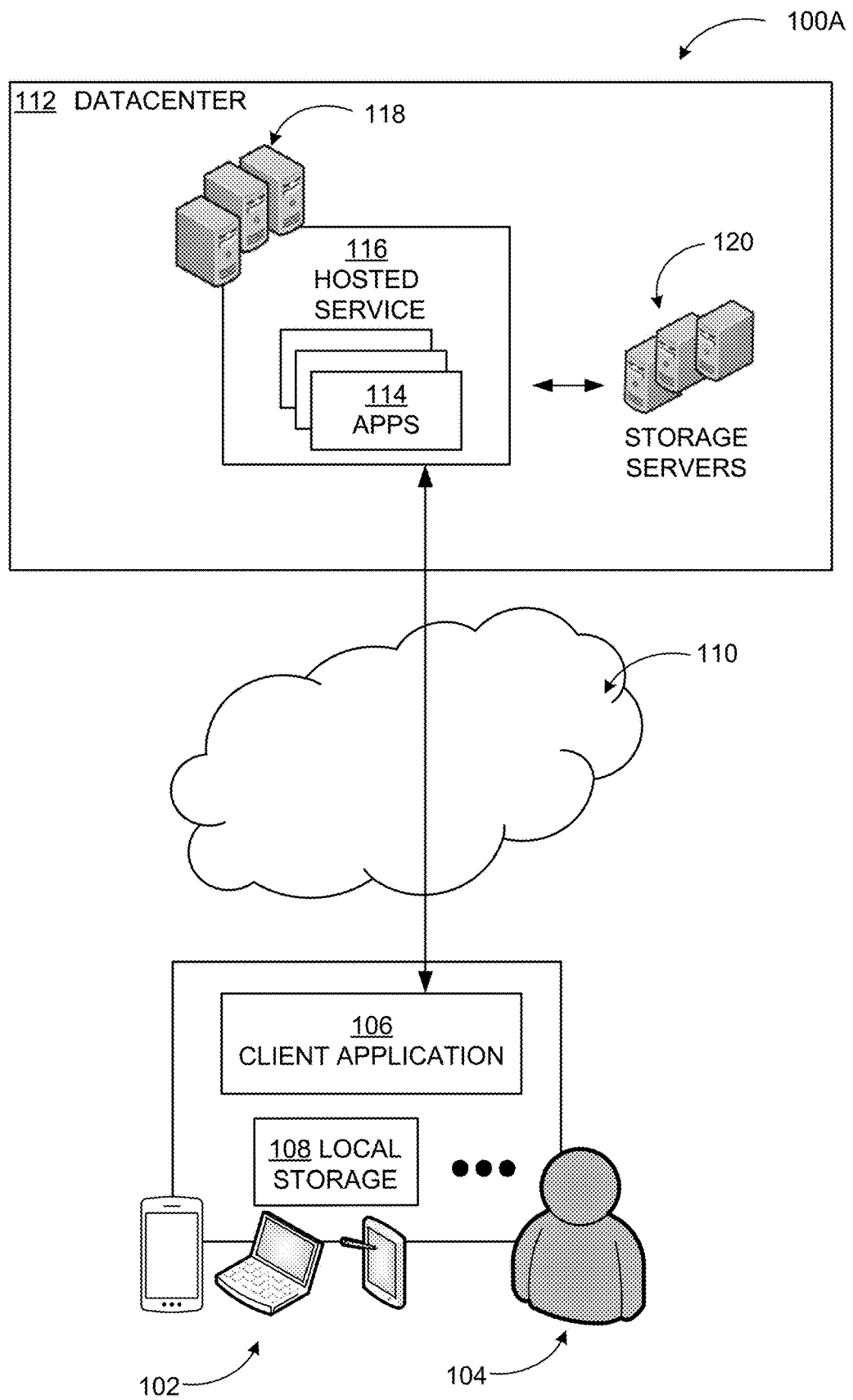
FIGS. 1A and 1B include display diagrams illustrating an example network environment where automatic group creation in a hosted service environment based on an organization hierarchy may be implemented.

As briefly described above, a hosted service may create a group automatically in a hosted service environment based on an organization hierarchy. In an example scenario, the hosted service may detect of a new organization hierarchy, a utilization of a feature of a hosted service by an existing organization hierarchy, and/or receive an input to create a group. In response, group members such as direct reports of a supervisor may be determined and a new group created based on the hierarchy. For example, the supervisor may be designated as the owner of the new group and the direct reports as the group members. The group owner may also be included as one of the group members. Furthermore, various group attributes and properties such as coordination of different services, permissions, and/or communication preferences, among others may be defined based on default rules, group owner preferences, and/or hierarchy attributes, among others.

Next, a resource may be generated for the created group. The resource may include a notebook, a work space, a collaboration site, and/or a planner. The newly created group may be deployed to coordinate various applications within the hosted service for the group members. Customization and modification of group membership, attributes, and/or properties associated with the created group may be allowed for the group owner and/or a selection from the group members. The resource may also be managed through the provided services.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for automatic group creation in a hosted service environment based on an organization hierarchy. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1B:
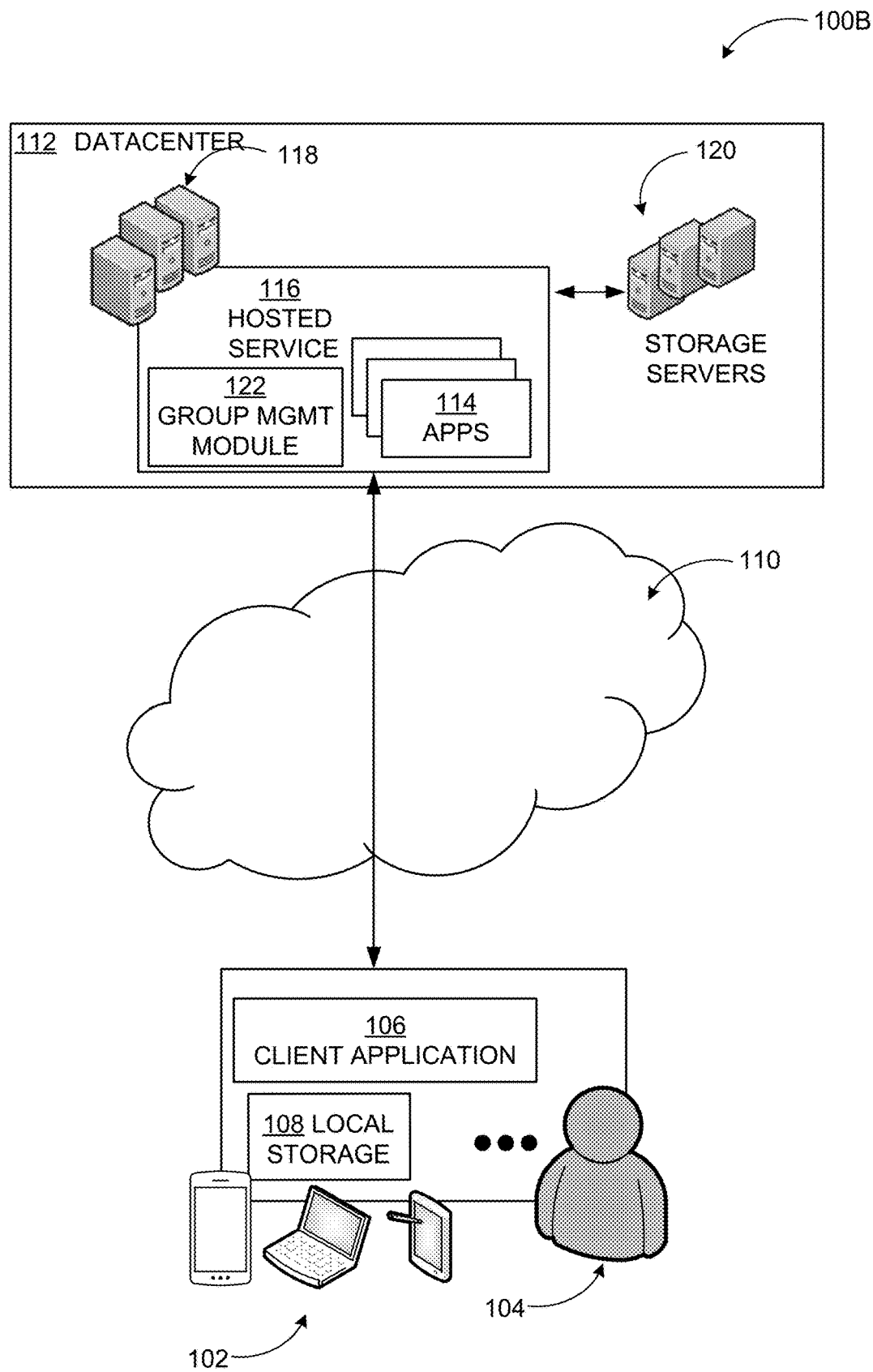

FIGS. 1A and 1B include display diagrams illustrating an example network environment where automatic group creation in a hosted service environment based on an organization hierarchy may be implemented.

As illustrated in diagrams 100A and 100B, an example system may include a datacenter 112 executing a hosted service 116 on at least one processing server 118. The hosted service 116 may include a productivity service, a collaboration service, a cloud storage service, a communication service, a scheduling service, an online conferencing service, and comparable ones.

In some embodiments, the hosted service 116 may be configured to interoperate with a client application 106 through one or more client devices 102 over one or more networks, such as network 110. For example, the client application 106 may include a word processing application, a presentation application, a notebook application, a spreadsheet application, a communication application, or a calendaring application in conjunction with a productivity service or a collaboration service. Alternatively, the client application 106 may include a synchronization application in conjunction with a cloud storage service.

The client devices 102 may include a desktop computer, a laptop computer, a tablet computer, a vehicle-mount computer, a smart phone, or a wearable computing device, among other similar devices. In some examples, the hosted service 116 may allow users to access its services through the client application 106 executed on the client devices 102. In other examples, the hosted service 116 may be provided to a tenant (e.g., a business, an organization, or similar entities), which may configure and manage the services for their users.

In one embodiment, as illustrated in diagram 100A, the processing server 118 may be operable to execute one or more applications 114, where the applications 114 may be integrated with the hosted service 116 and provide various focused services. In another embodiment, as illustrated in diagram 100B, a group management module 122 may be integrated with the hosted service 116 and provide automatic group creation in a hosted service environment based on an organization hierarchy. As described herein, the hosted service 116, the applications 114, and/or the group management module 122 may be implemented as software, hardware, or combinations thereof.

In an example scenario, the group management module 122 may determine an eligible manager and direct reports of the manager. The group management module 122 may check if there is an existing group for the manager and the direct reports. Upon determining that no such group exists, the group management module 122 create a group.

Next, the group management module 122 may designate the manager as the group owner and the direct reports as group members by default. The group management module 122 may also define group attribute(s) such as permission levels, communication preferences, and/or group identifier, among others based on default rules, and/or manager preferences, among other factors.

An automated communication may also be sent to the group owner to inform the group owner about the created group. The group owner may also be granted privilege(s) associated with the created group such as editing privileges and/or deletion privileges including the group, its members, and/or attributes, among others. The group management module 122 may also create resource(s) associated with the created group such as notebook(s), work space(s), collaboration site(s), and/or planner(s), among others which may be managed through services provided by the applications 114 associated with the hosted service.

As previously discussed, the increasing variety and depth of hosted services, has made providing user interactions and collaboration within hosted services and applications a challenge. Automatic group creation in a hosted service environment based on an organization hierarchy, as described in the embodiments herein, may aid in improving performance and efficiency of hosted services, reduce the amount of processing and network bandwidth usage, and improve user interaction and user efficiency by automatically creating collaboration tools (such as group features) and incentivizing a user through interactions associated with the hosted service.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of devices and users using hosted services.

Figure 2:
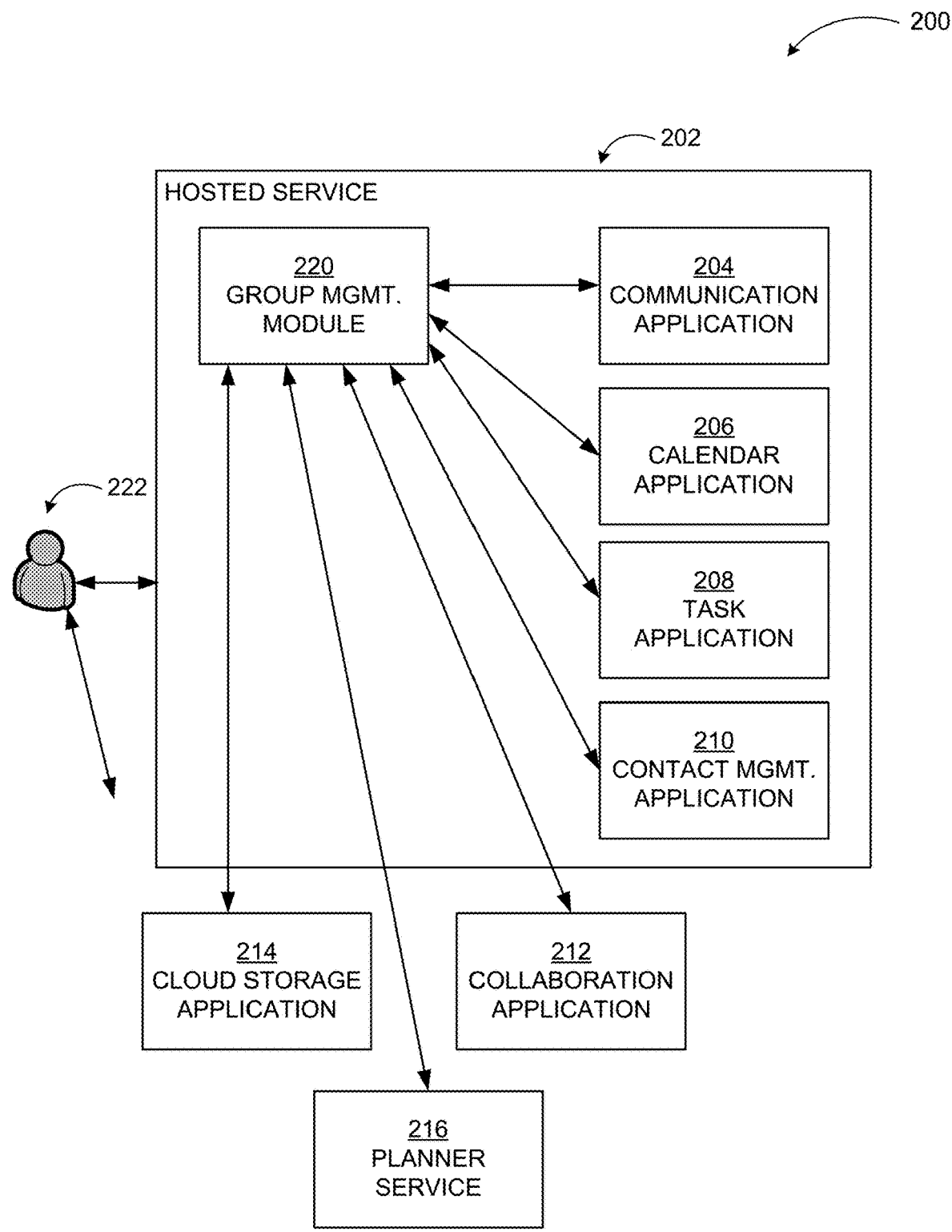
FIG. 2 includes a conceptual display diagram illustrating an example of a group management module coordinating services of various applications within or outside of an example hosted service.

FIG. 2 includes a conceptual display diagram illustrating an example of a group management module coordinating services of various applications within or outside of an example hosted service.

Diagram 200 shows interactions between a group management module 220 within a hosted service 202 and applications that are components of the hosted service 202, as well as, applications within other hosted services. For example, the hosted service 202 may include a communication application 204 (e.g., email, text messaging, online conferences, audio calls, video calls, etc.), a calendar application 206 (e.g., scheduling of meetings, events, etc.), a task application 208, and a contact management application 210.

A cloud storage application 214 may be part of a separate cloud storage service or the hosted service 202. The cloud storage application 214 may manage cloud storage of user data. A collaboration application 212 may be part of a collaboration service and provide collaboration services through team sites and other tools. A planner service 216 may also be used in conjunction with a created group.

A user 222 may use some or all of the example applications and services provided by the example applications. Collaboration between the user 222 and other users (e.g., within a group that includes a group owner and group members) may be enhanced by coordinating a utilization of the applications. For example, allowing communications that involve the created group to be stored in a group inbox, documents associated with the created group to be stored in a group cloud storage, and/or creation of a team collaboration site, among others.

Resource(s) such as discussion(s), file(s), calendar(s) and/or note(s) may be automatically created in an association with the created group based on policies governing the creation of the group and/or based on input by the group owner. The resource(s) may be stored in a unified way that is easy to find for the group members. Furthermore, a history associated with the discussion(s), file(s), calendar(s), communication(s), and/or note(s), among other resource(s) may be stored to provide access to historical information associated with the created group upon request. In addition, file(s), notebook(s), planner service(s), and collaboration site(s) may be configured and deployed for consumption by the created group.

Figure 3:
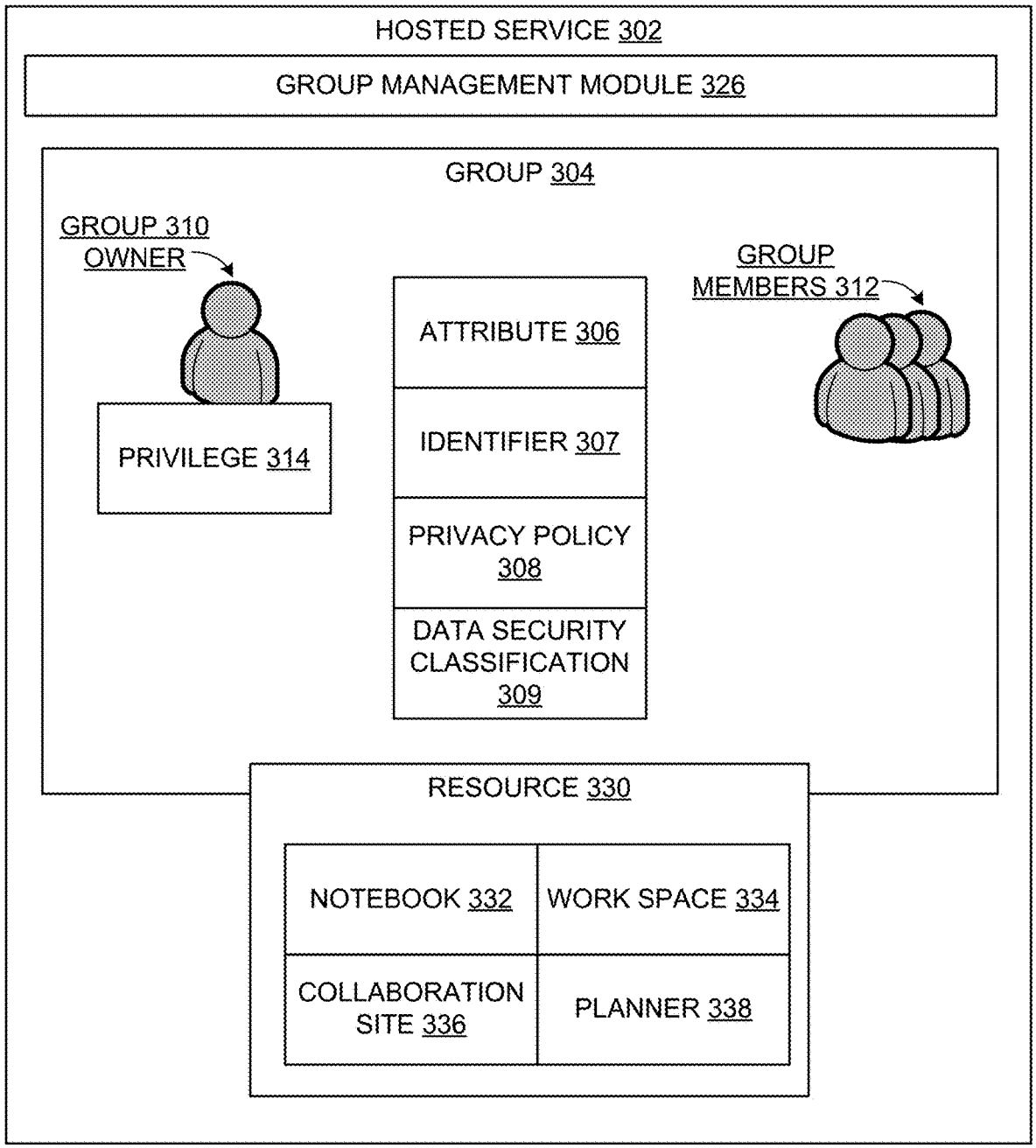
FIG. 3 includes a display diagram of a scheme to create a group automatically in a hosted service environment based on an organization hierarchy.

FIG. 3 includes a display diagram of a scheme to create a group automatically in a hosted service environment based on an organization hierarchy.

As shown in a diagram 300, a group management module 326 of a hosted service 302 may automatically create a group based on an organization hierarchy. The hosted service may determine group members 312 for a group 304 based on an organization hierarchy. The organization hierarchy may include a new branch that designates the group members 312 as subordinates of a manager. The manager may be designated as a group owner 310. Alternatively, a branch of an existing hierarchy may be processed to identify the group members 312 upon detecting a utilization of a feature of the hosted service 302 by one or more of the group members 312. The branch may be selected for automated creation of the group 304. A manager of the group members 312 may be designated as the group owner 310.

Next, an attempt to create the group 304 may be verified against existing groups to prevent a duplication of an existing group. Upon verifying that the group 304 is not a duplicate of an existing group, the group 304 may be created with the group owner 310 and the group members 312. The group owner 310 may be granted a privilege 314 associated with the created group 304. The privilege 314 may allow the group owner 310 to add a new member, to delete an existing member, to modify the created group 304, and/or to delete the created group 304, among other rights. The group owner 310 may also be provided with the privilege 314 that may allow the group owner 310 to create, edit, and/or delete an attribute 306, an identifier 307, a privacy policy 308, and/or a data security classification 309 associated with the created group 304. Alternatively, the privilege 314 may also be extended to a selection of the group members 312, manually by the group owner 310 and/or based on an organizational policy.

A resource 330 associated with the created group 304 may also be generated automatically upon the creation of the group 304. Alternatively, a manual confirmation from the group owner 310 may be requested prior to creation of the resource 330. The resource may include a notebook 332, a work space 334, a collaboration site 336, and/or a planner 338, among others. The resource 330 may be customized for individual consumption by a member of the created group 304. Alternatively, the resource 330 may include a shared resource consumed by all and/or a selection of the group members 312.

Figure 4:
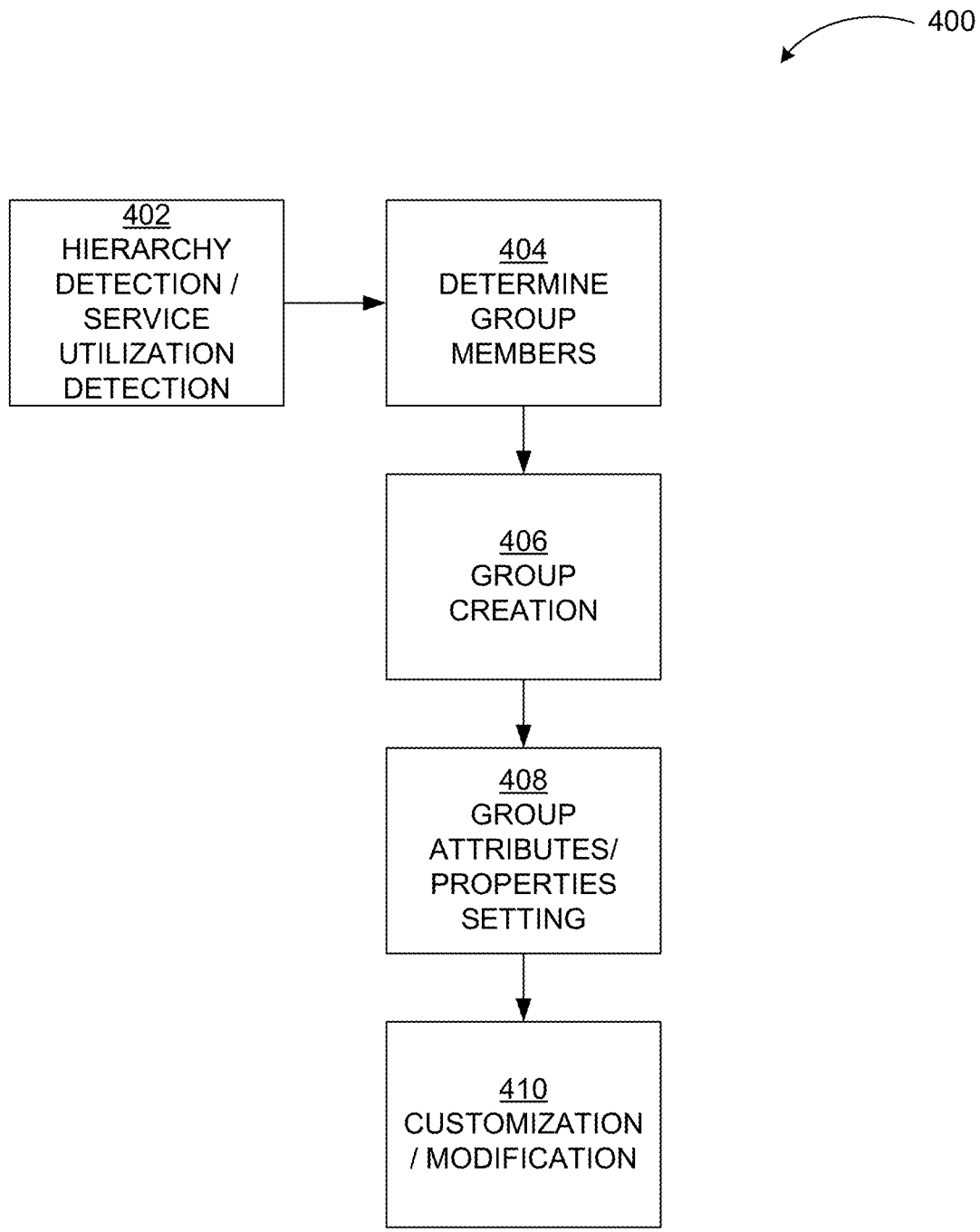
FIG. 4 includes a display diagram illustrating example actions in automatic group creation in a hosted service environment based on an organization hierarchy.

FIG. 4 includes a display diagram illustrating example actions in automatic group creation in a hosted service environment based on an organization hierarchy.

As shown in diagram 400, a new or existing organization hierarchy or a utilization of a feature of a hosted service by an existing hierarchy may be detected at stage 402. Next, an eligibility of the group owner (such as a manager) and group members (such as direct reports) may be determined as described herein at stage 404.

A group creation 406 action may include transmission of a communication (such as an email) to the group owner and the group members. The communication may inform the group owner and/or the group members regarding the new group. The communication may also provide a functionality to edit and/or delete the newly created group.

Group attributes and properties may be defined at stage 408 based on default rules, group owner preferences, group member permissions, and/or other factors. Upon deployment of the created group, customization and/or modification of group membership, attributes, and/or properties may be provided as a functionality at stage 410.

Once the group is created, the group owner and/or the group members (stakeholders) may receive a welcome communication informing the stakeholders regarding creation of the group and a variety of utilization approaches that may be available to engage the created group. Existing tools used for communication(s) and collaboration(s) may continue to work with the added benefit of group filtering (such as organizing the communication(s) and collaboration(s) based on hierarchies associated with the created group). Group members may be automatically subscribed to the created group. Therefore, whenever a communication to the created group is received, the group members may receive the communication in associated inbox(es) by default.

A manager of the group members may automatically be privileged as a group owner. As such, The group owner may be allowed to revise and/or update the created group's identifier (such as a name, membership, privacy, data security classification, and/or other attributes/properties at any time. The group owner may add and/or remove group member(s) on demand. The group owner may also be privileged to delete the created group.

In some example implementations, manager(s) and other user(s) in an organization hierarchy may opt out of automatic group creation. For example, a chief executive officer or other high level officer of a company may be requested to be added to too many automated group creation events that may diminishes usefulness associated with the automated group creation schemes. As such, the high level officer may be allowed opt out of automatic group creation and/or automatically unenrolled from automated group creation events based on rule(s) and/or policies associated with the organization.

In other examples, automatic group creation may include determination of an eligibility of a manager to be designated as a group owner. The eligibility may be determined based on one or more criteria. For example, an asset associated with the group owner (such as a communication mailbox associated with the group owner) may be verified for a continuous utilization during a designated time period (such as 30 days). Furthermore, an eligibility associated with the group members may also be similarly verified.

Another scheme to verify the eligibility may include a verification of the asset as a part of a communication service. The asset may also be verified to be public and not private. A permission associated with the group owner's account to create the group may also be verified. Moreover, the group owner's direct reports may be verified to have a "Manager" field (or similar organizational role) populated in the organization directory in order to correctly identify them as direct reports to the group owner. Furthermore, the number of created groups per group owner may be limited as well.

Automatically created groups may also be identified through a group property (such as a parameter) or through an identifier (such as a name). For example, a default name of "<Group owner's Name> Direct Reports" may be assigned to the created group. A naming scheme may also comply with an organizational group naming policy. Furthermore, group membership in the created group may be static or dynamic. As such, if a direct report leaves the organization after the creation of the group, the direct report may be automatically removed from the group and/or removed by the group owner manually.

Figure 5:
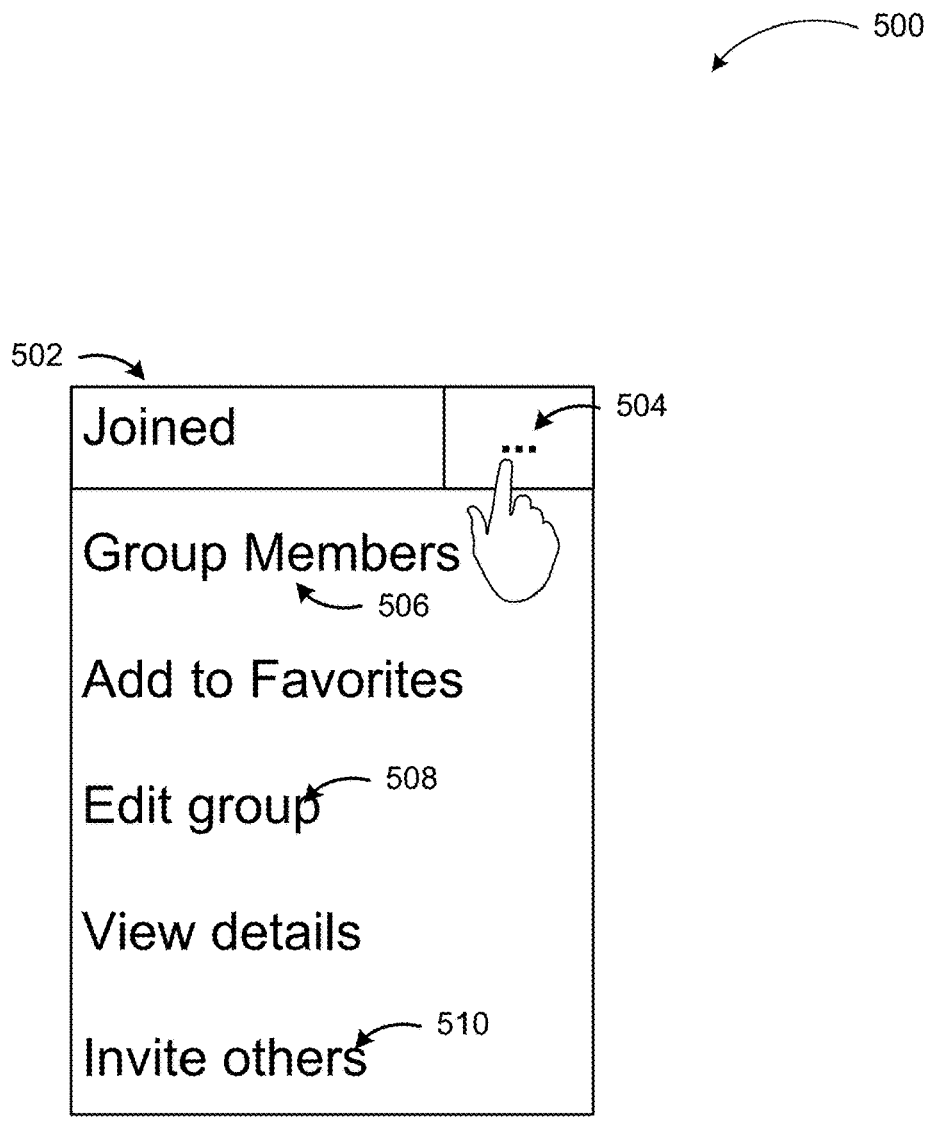
FIG. 5 includes a display diagram illustrating an example user interface of a group management module for editing an automatically created group.

FIG. 5 includes a display diagram illustrating an example user interface of a group management module for editing an automatically created group.

Diagram 500 includes a group customization user interface 502. The group customization user interface 502 may be displayed upon automatic creation of a group. The group customization user interface 502 may include functionality that may allow a group owner to modify group membership, attributes, and/or properties, among others associated with the created group.

Furthermore, a list of default group members may be listed upon a selection of a members menu item 506. Moreover, an edit group menu item 508 may provide functionality to change group attributes such as permissions, communication preferences, inbox and/or data storage locations, and/or workloads for the group, among others associated with the created group. The group owner may also invite new members through the invite others menu item 510. Further customization and/or modification options may be provided through additional control 504.

The example scenarios and schemas in FIG. 1 through 5 are shown with specific components, data types, and configurations. Embodiments are not limited to systems according to these example configurations. Automatic group creation based on an organization hierarchy may be implemented in configurations employing fewer or additional components in applications and user interfaces. Furthermore, the example schema and components shown in FIG. 1 through 5 and their subcomponents may be implemented in a similar manner with other values using the principles described herein.

Figure 6:
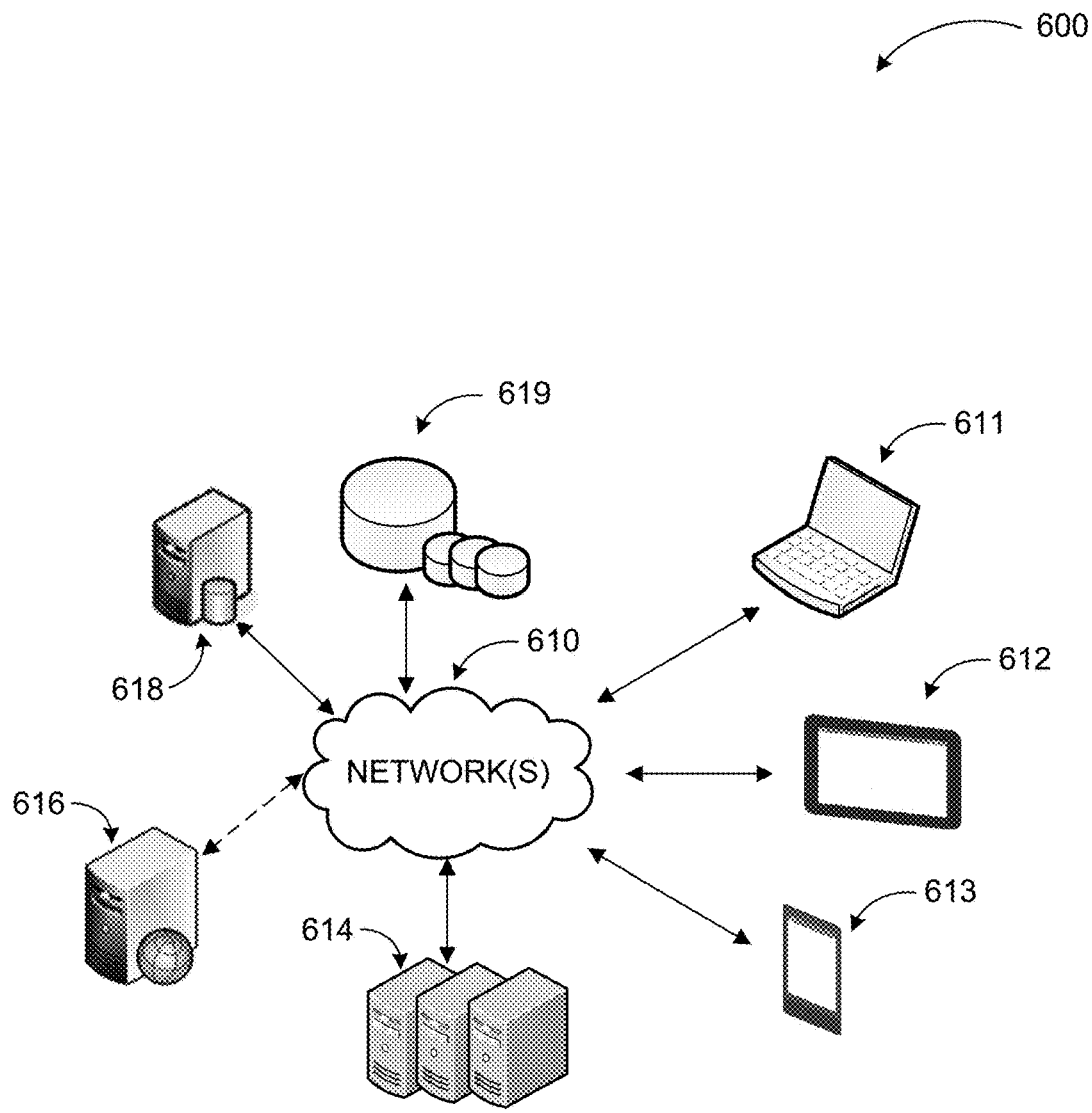
FIG. 6 is a networked environment, where a system according to embodiments may be implemented.

FIG. 6 is an example networked environment, where embodiments may be implemented. In a diagram 600, a hosted service configured to automatically create a group based on an organization hierarch may be implemented via software executed over one or more servers 614 such as a hosted service. The platform may communicate with client applications on individual computing devices such as a smart phone 613, a mobile computer 612, or desktop computer 611 ('client devices') through network(s) 610.

Client applications executed on any of the client devices 611-613 may facilitate communications via application(s) executed by servers 614, or on individual server 616. A hosted service may detect a new organization hierarchy or a utilization of a feature of a hosted service by an existing organization hierarchy. Next, group members may be determined based on the organization hierarchy. A group may be created comprising the group members to coordinate services within the hosted service based on the organization hierarchy. Furthermore, an attribute of the created group may be defined. A resource may also be generated for the created group. The resource may include a notebook, a work space, a collaboration site, and/or a planner. The created group may be deployed to coordinate the services. The resource may also be managed through the services. The hosted service may store data associated with the created group in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to automatically create a group based on an organization hierarch. Furthermore, the networked environments discussed in FIG. 6 are for illustration purposes only. Embodiments are not limited to the example applications, modules, or processes.

Figure 7:
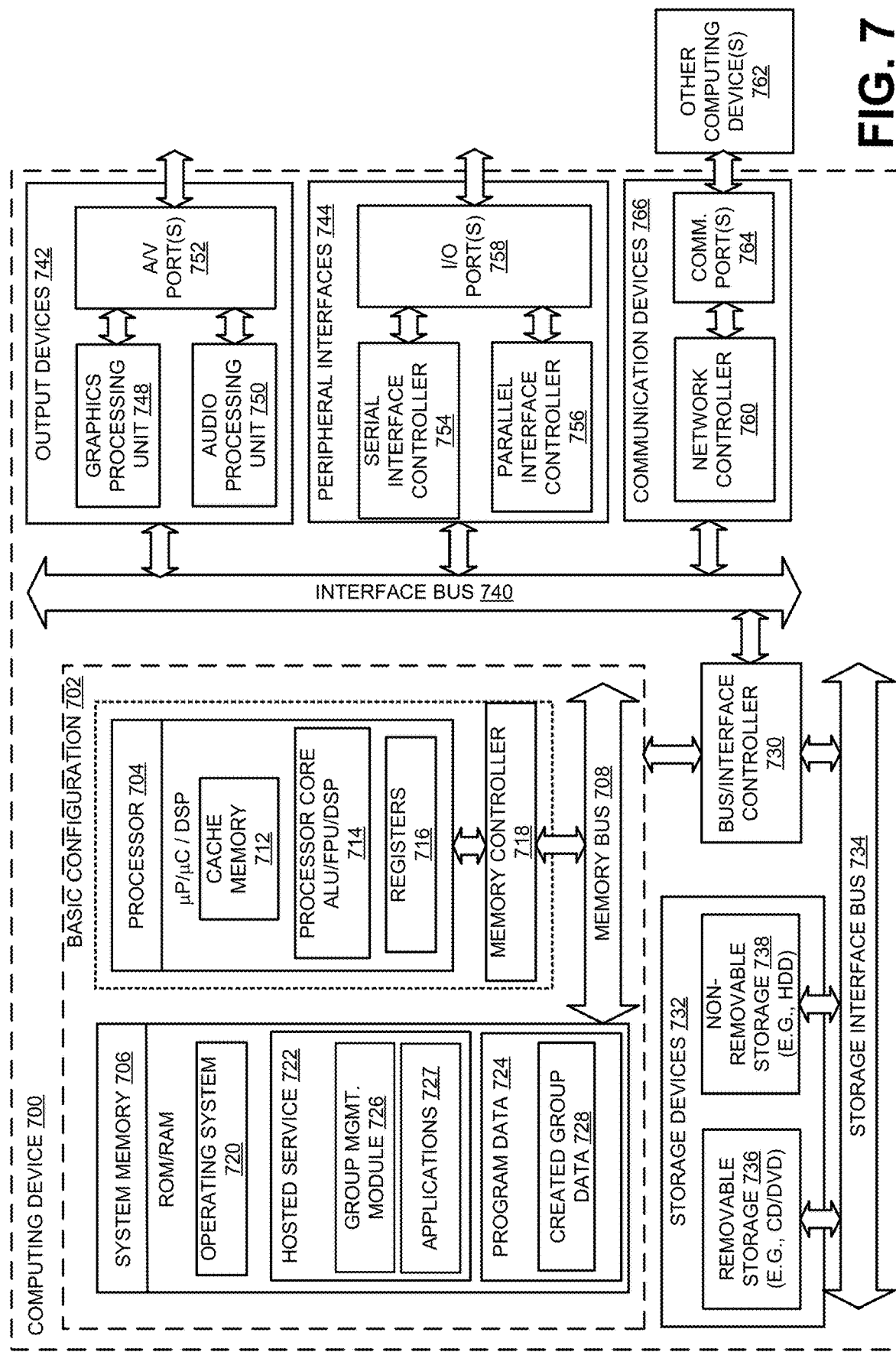
FIG. 7 illustrates a computing device, which may be configured to provide automatic group creation in a hosted service environment based on an organization hierarchy.

FIG. 7 is a block diagram of an example computing device, which may be used to provide automatic group creation in a hosted service environment based on an organization hierarchy, according to embodiments.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), a graphics processing unit (GPU), or any combination thereof. An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a hosted service 722, and a program data 724. The hosted service 722 may include components such as a group management module 726 and services 727. The group management module 726 and the applications 727 may execute the processes associated with the hosted service 722. The group management module 726 may detect a new organization hierarchy or a utilization of a feature of a hosted service by an existing organization hierarchy. Next, group members may be determined based on the organization hierarchy. A group may be created comprising the group members to coordinate services within the hosted service based on the organization hierarchy. Furthermore, an attribute of the created group may be defined. A resource may also be generated for the created group. The resource may include a notebook, a work space, a collaboration site, and/or a planner. The created group may be deployed to coordinate the services. The resource may also be managed through the services provided by the applications 727.

Input to and output out of the hosted service 722 may be transmitted through a communication device 766 that may be communicatively coupled to the computing device 700. The communication device 766 may provide wired and/or wireless communication. The program data 724 may also include, among other data, a created group data 728, or the like, as described herein. The created group data 728 may include information associated with the group owner, the group members, among others.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example of the communication device(s) 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a specialized server, mainframe, or similar computer, which includes any of the above functions. The computing device 700 may also be implemented as a personal computer including both laptop computer and non-laptop computer configurations. Additionally, the computing device 700 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to provide automatic group creation in a hosted service environment based on an organization hierarchy. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
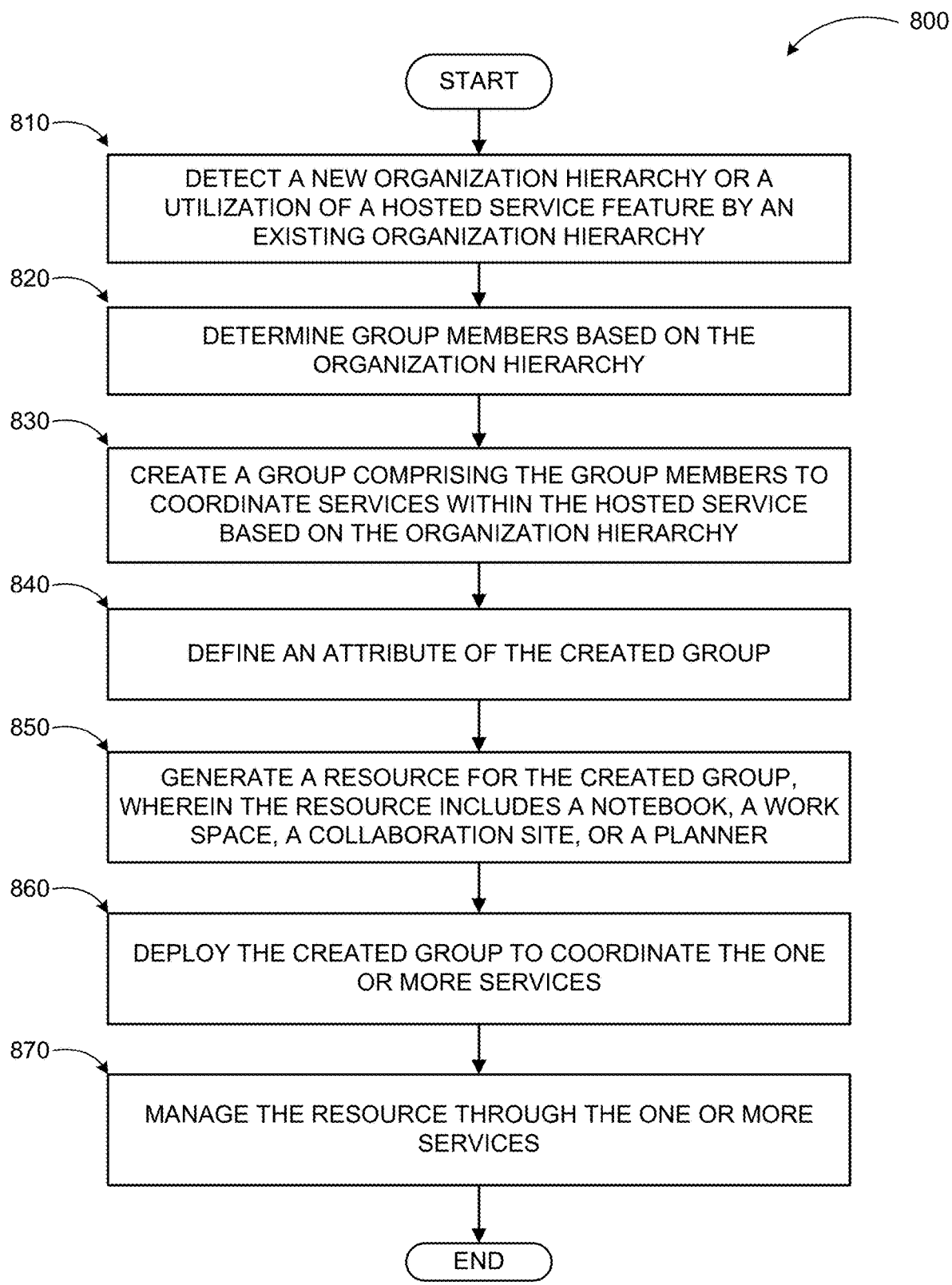
FIG. 8 illustrates a logic flow diagram for an example process to provide automatic group creation in a hosted service environment based on an organization hierarchy.

FIG. 8 is a logic flow diagram illustrating a process to provide automatic group creation in a hosted service environment based on an organization hierarchy, according to embodiments. Process 800 may be implemented on a computing device, such as the computing device 700 or another system.

Process 800 begins with operation 810, where a hosted service may detect a new organization hierarchy or a utilization of a feature of a hosted service by an existing organization hierarchy. Next, at operation 820, group members may be determined based on the organization hierarchy. At operation 830, a group may be created comprising the group members to coordinate services within the hosted service based on the organization hierarchy.

At operation 840, an attribute of the created group may be defined. A resource may also be generated for the created group at operation 850. The resource may include a notebook, a work space, a collaboration site, and/or a planner. At operation 860, the created group may be deployed to coordinate the services. The resource may also be managed through the services at operation 870.

The operations included in process 800 is for illustration purposes. Providing automatic group creation based on an organization hierarchy may be implemented by similar processes with fewer or additional steps, as well as in different order of operations using the principles described herein. The operations described herein may be executed by one or more processors operated on one or more computing devices, one or more processor cores, specialized processing devices, and/or special purpose processors, among other examples.

According to some examples, a method to provide automatic group creation in a hosted service environment based on an organization hierarchy is described. The method includes detecting one or more of a new organization hierarchy and a utilization of a feature of a hosted service by an existing organization hierarchy, determining group members based on the organization hierarchy, creating a group comprising the group members to coordinate one or more services within the hosted service based on the organization hierarchy, defining an attribute of the created group, associating the created group with a resource, wherein the resource includes one or more of a notebook, a work space, a collaboration site, and a planner, deploying the created group to coordinate the one or more services, and managing the resource through the one or more services.

According to other examples, the method further includes defining the attribute of the group based on one or more of a default rule, a group owner preference, and an organization hierarchy attribute. The method further includes designating a user at a top of the organization hierarchy as a group owner and designating users reporting to the user at the top of the organization hierarchy as the group members. The attribute of the created group comprises one or more of the services within the hosted service to be coordinated, a communication preference for the group, a collaboration preference for the group, and a permission for the group members to access the resource. The method further includes performing a review of existing groups associated with a group owner based on one or more criteria prior to creating the group to avoid duplication with an existing group.

According to further examples, the method further includes designating an identifier for the created group that identified the created group as an automatically created group and distinguished the created group from a manually created group. The method further includes creating a communication inbox for the created group. The method further includes providing a control to access the group and functionalities associated with the group through user interfaces of one or more applications within the hosted service. The hosted service is one of a cloud storage service, a productivity service, a collaboration service, a communication service, and a calendaring service. The method further includes transmitting a welcome message to a group owner and the group members indicating the group has been automatically created and providing one or more instructions and controls associated with using and editing the created group.

According to some examples, a server configured to provide automatic group creation based on an organization hierarchy is described. The server includes a communication device configured to facilitate communication between a client device and the server, wherein the server is configured to execute a hosted service, a memory configured to store instructions, one or more processors coupled to the memory and the communication device. The one or more processors, in conjunction with the instructions stored in the memory, execute a group management module of the hosted service. The group management module is configured to detect one or more of a new organization hierarchy and a utilization of a feature of the hosted service by an existing organization hierarchy, determine group members based on the organization hierarchy, create a group comprising the group members to coordinate one or more services within the hosted service based on the organization hierarchy, define an attribute of the created group, deploy the created group to coordinate the one or more services, and transmit, through the communication device, a welcome message to a group owner and the group members indicating the created group has been automatically created and providing one or more instructions and controls associated with using and editing the created group.

According to other examples, the group management module is further configured to provide a customization functionality that allows the group owner to configure one or more of an identifier, a membership, a privacy policy, and a data security classification associated with the created group. The group management module is further configured to grant the group owner a privilege associated with the created group, wherein the privilege includes one or more permissions to add a new member, delete an existing member, and delete the created group. The group management module is further configured to confirm an eligibility of the group owner to manage the created group by detecting a utilization of an asset by the group owner exceed or equal a time period threshold, wherein the asset is associated with an organization directory.

According to further examples, the group management module is further configured to confirm an ineligibility of the group owner to manage the created group by detecting a utilization of an asset by the group owner fall below a time period threshold, wherein the asset is associated with an organization directory and remove an ownership privilege associated with the created group from the group owner. The group management module is further configured to transmit a message to the group owner to prompt the group owner to revalidate an eligibility to manage the created group. The group management module is further configured to identify a direct subordinate of the group owner from the group members, verify an eligibility of the direct subordinate to manage the created group, grant the ownership privilege associated with the created group to the direct subordinate, and transmit a message to the direct subordinate to inform the direct subordinate of the ownership privilege.

According to some examples, a computer-readable memory device with instructions stored thereon to provide automatic group creation in a hosted service environment based on an organization hierarchy is described. The instructions include actions that are similar to the actions of the method and/or the group management module of the hosted service executed by the processor(s) of the server.

According to some examples, a means for providing automatic group creation in a hosted service environment based on an organization hierarchy is described. The means for providing automatic group creation in a hosted service environment based on an organization hierarchy include a means for detecting one or more of a new organization hierarchy and a utilization of a feature of a hosted service by an existing organization hierarchy, a means for determining group members based on the organization hierarchy, a means for creating a group comprising the group members to coordinate one or more services within the hosted service based on the organization hierarchy, a means for defining an attribute of the created group, a means for associating the created group with a resource, wherein the resource includes one or more of a notebook, a work space, a collaboration site, and a planner, a means for deploying the created group to coordinate the one or more services, and a means for managing the resource through the one or more services The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide automatic group creation in a hosted service environment, the method comprising:
determining a group member and a group owner for a group created based on a new organization hierarchy;
confirming an eligibility of the group owner to manage the created group by detecting a utilization of an asset by the group owner exceeding or equal to a time period threshold;
deploying the created group to coordinate one or more services within the hosted service environment; and
removing, in response to detecting the utilization of the asset by the group owner falling below the time period threshold, an ownership privilege associated with the created group from the group owner.

2. The method of claim 1, wherein the asset is associated with an organization directory.

3. The method of claim 1, further comprising automatically creating the group in response to at least one of detecting a utilization of a feature of the hosted service environment by a member of an existing organization hierarchy and the new organization hierarchy.

4. The method of claim 1, further comprising:
providing a customization functionality to the group owner to configure one or more selected from a group consisting of an identifier associated with the created group, a membership associated with the created group, a privacy policy associated with the created group, and a data security classification associated with the created group.

5. A computer-readable memory device with instructions stored thereon to provide automatic group creation in the hosted service environment based on an organization hierarchy, the instructions comprising:
detecting at least one of a new organization hierarchy and a utilization of a feature of the hosted service by a member of an existing organization hierarchy;
creating, in response to detecting the utilization of the feature of the hosted service by the member of the existing organization hierarchy, a group including a group member and a group owner;
deploying the created group to coordinate one or more services within the hosted service; and
removing, in response to detecting a utilization of an asset by the group owner falling below a threshold, an ownership privilege associated with the created group from the group owner.

6. The computer-readable memory device of claim 5, the instructions further comprising:

selectively allowing access to the one or more services within the hosted service based on the new organization hierarchy;

defining an attribute of the created group;

associating the created group with a resource; and managing the resource through the one or more services.

7. The computer-readable memory device of claim 5, wherein the threshold is a time period threshold.

8. The computer-readable memory device of claim 7, the instructions further comprising:

transmitting a message to the group owner.

9. The computer-readable memory device of claim 7, the instructions further comprising:

identifying a direct subordinate of the group owner;

verifying an eligibility of the direct subordinate to manage the created group; and granting, in response to verifying the eligibility of the direct subordinate to manage the created group, the ownership privilege associated with the created group to the direct subordinate.

10. A system configured to provide automatic group creation, the system comprising:

a communication device configured to facilitate communication between a client device and a server, wherein the server is configured to execute a hosted service;

a memory configured to store instructions; and one or more processors coupled to the memory and the communication device, wherein the one or more processors, in conjunction with the instructions stored in the memory, are configured to:

detect at least one of a new organization hierarchy and a utilization of a feature of the hosted service by a member of an existing organization hierarchy;

create, in response to detecting at least one of the new organization hierarchy and the utilization of the feature of the hosted service by the member of the existing organization hierarchy, a group, the group including a group member and a group owner;

deploy the created group to coordinate one or more services within the hosted service; and remove, in response to detecting a utilization of an asset by the group owner falling below a threshold, an ownership privilege associated with the created group from the group owner.

11. The system of claim 10, wherein the one or more processors are further configured to confirm an eligibility of the group owner to manage the created group by detecting a utilization of the asset by the group owner exceeding or equal to the threshold.

12. The system of claim 10, wherein the asset is associated with an organization directory.

13. The server of claim 10, wherein the one or more processors are further configured to:

selectively allow access to the one or more services within the hosted service based on the new organization hierarchy;

define an attribute of the created group;

associate the created group with a resource; and manage the resource through the one or more services.

14. The system of claim 13, wherein the one or more processors are configured to define the attribute of the created group based on one or more selected from a group consisting of a default rule, a group owner preference, and an organization hierarchy attribute.

15. The system of claim 13, wherein the attribute of the created group includes one or more selected from a group consisting of the one or more services within the hosted service, a communication preference for the group, a collaboration preference for the group, and a permission for the group member to access the resource.

16. The system of claim 10, wherein the one or more processors are further configured to determine the group member and the group owner based on the new organization hierarchy by:

designating a user at a top of the new organization hierarchy as the group owner; and designating a user reporting to the user at the top of the new organization hierarchy as the group member.

17. The system of claim 10, wherein the one or more processors are further configured to review one or more existing groups associated with the group owner based on one or more criteria prior to creating the group to avoid duplication with an existing group.

18. The system of claim 10, wherein the one or more processors are further configured to create a communication inbox for the created group.

19. The system of claim 10, wherein the one or more processors are further configured to provide one or more controls to access a functionality associated with the group through one or more user interface of one or more applications within the hosted service.

20. The system of claim 10, wherein the one or more processors are further configured to transmit a welcome message to the group owner and the group member indicating the group has been automatically created and providing one or more selected from a group consisting of an instruction associated with using and editing the created group and a control associated with using and editing the created group.

* * * * *